(No Model.)
E. D. OWEN.
CULTIVATOR.
No. 480,128. Patented Aug. 2, 1892.
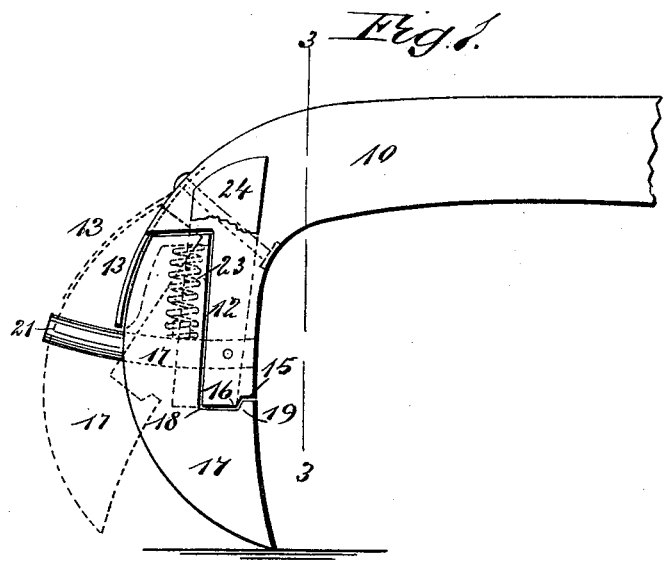
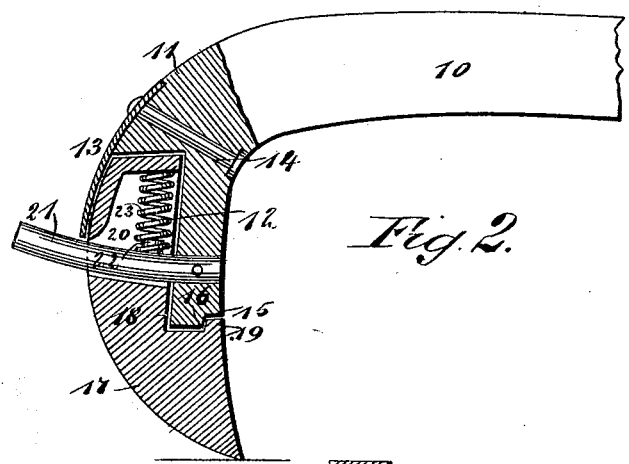
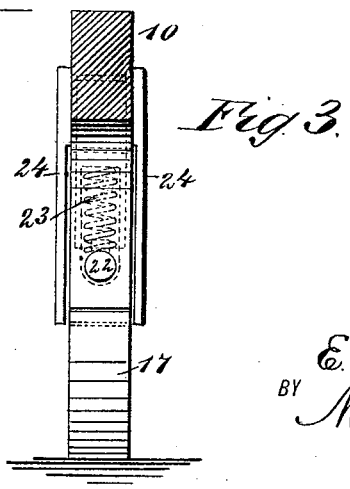
WITNESSES:
F. McArdle
C. Sedgwick
INVENTOR
E. D. Owen
BY Munn & Co.
ATTORNEYS

UNITED STATES PATENT OFFICE.

EMERT D. OWEN, OF OAHE, SOUTH DAKOTA.

CULTIVATOR.

SPECIFICATION forming part of Letters Patent No. 480,128, dated August 2, 1892.

Application filed October 26, 1891. Serial No. 409,841. (No model.)

*To all whom it may concern:*

Be it known that I, EMERT D. OWEN, of Oahe, in the county of Hughes and State of South Dakota, have invented a new and useful Improvement in Cultivators and Like Implements, of which the following is a full, clear, and exact description.

My invention relates to an improvement in cultivators, plows, and like agricultural implements, and has for its object to so construct the beam and the shank that when the point or tooth carried by the latter strikes an obstruction the point will give sufficiently to prevent the parts from breaking, and wherein after the obstruction is passed the shank will automatically readjust itself to the beam, assuming its former or normal position; and to that end the invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of a portion of the beam and of the shank attached to the beam. Fig. 2 is a vertical section through the rear portion of the beam and the shank; and Fig. 3 is a vertical section through a portion of the beam, said section being taken on the line 3 3 of Fig. 1, the lower portion of the beam and the shank being in front elevation.

The beam 10 is curved downward at its rear end, and in the back of the curved section 11 of the beam a recess 12 is produced, the said recess being essentially L-shaped or angular. Upon the rear portion of the beam above the recess a spring-plate 13 is secured through the medium of a bolt 14 or like fastening device, which spring-plate curves downward some distance over the recess 12. At the front lower extremity of the beam a small recess 15 is formed, producing thereby a shoulder 16. The shank 17 is decidedly convex upon its rear surface, and the said shank is provided in its front upper portion with a recess 18, the base-wall of said recess at the front having formed thereon an upwardly-extending rib or lip 19. The formation of the shank is such that its upper rear portion snugly fits in the recess of the beam and the lower wall of its recess 18 fits snugly against the lower forward extremity of the beam, the rib or lip 19 entering the recess 15 of the latter, the said lip or rib having a bearing against the shoulder 16 of the beam, as shown in Figs. 1 and 2. Within the upper portion of the shank a chamber 20 is formed, having an opening at the back of the shank, and through the chamber and opening of the shank a curved pin 21 is projected, which pin at its forward end is rigidly fastened to the beam. Within the chamber 20 of the shank the pin 21 is provided with a stud 22, and to the stud the lower end of a spring 23 is attached, the upper end of which spring has a bearing against the upper wall of the chamber 20, as best shown in Fig. 2, the spring 23 being preferably a spiral or coil spring. The pin 21 normally extends some distance beyond the rear portion of the shank and immediately beneath the lower end of the spring-plate 13. The shank is held in connection with the beam through the medium of the spring-plate 13, the spring 23, and the pin 21, in addition to guard-plates 24, attached one at each side of the beam and extending downward over the sides of the shank, as shown in Fig. 3.

In the operation of this attachment, which primarily consists in the application of a stop-pin to an agricultural implement, as the front faces of both the shank and the beam are smooth, trash or vines will not cling thereto, but will readily pass off therefrom, and in the event the share or tooth attached to the shank should meet with an obstruction the said share or tooth will not remain long in engagement with the obstruction, as the tension upon the lower end of the shank is downward when such obstruction is encountered. Therefore the rib 19 of the shank will quickly leave the recess of the beam and permit the shank to be carried backward, as shown in dotted lines in Fig. 1, against the tension of the spring-plate 13, the shank being guided in its rearward movement by the pin 21. As the shank moves rearward, the spring 23 is pressed, so that the moment that the point is free of the obstruction the spring-plate 13 acts to force the shank forward to its normal position and the spring 23 acts to force the shank downward, so that its rib or lip 19 will readily enter the recess 15. It will be observed that as the front faces of both the shank and the lower portion of the beam are smooth any trash that may adhere to these faces will drop immediately upon the shank being thrown rearward, and it is further obvious than when the shank is sprung rearward it may be returned to its normal position whenever the operator may desire by simply lifting upward the beam. It is also apparent that the shank is not held in its normal position by the springs only, but that the rib or lip 19 assists the springs, thus insuring the shank remaining in its normal position even should the springs weaken.

Having thus described my invention, I claim as new and desire to secure by Letters Patent—

1. In an agricultural implement, the combination, with a beam the lower end of which is curved and provided with a recess at its rear and a spring-plate secured to the beam and extending downward over the recess, of a shank a portion of which extends below the beam and another portion is fitted in the recess of the beam, a curved pin attached to the beam and extending rearwardly through and beyond the shank, and a spring located within a chamber of the shank and connected with the pin, the spring-plate having a bearing against the upper rear portion of the shank, as and for the purpose set forth.

2. In an agricultural implement, the combination, with a beam the lower end of which is curved downward, provided with a recess in the upper rear portion of its curved section and a smaller recess at the front lower end of said section, of a shank having a recess in its front upper portion, one section of the shank fitting in the recess of the beam, the said shank being fitted with a rib fitting in the lower recess of the beam and the front surfaces of the shank and beam being smooth, a spring-plate secured to the beam and having a bearing against the upper portion of the shank, an upwardly-curved pin attached to the beam and extending through and beyond the rear portion of the shank, and a spring contained within a chamber of the shank and attached at one end to the pin, as and for the purpose specified.

EMERT D. OWEN.

Witnesses:
ARTHUR WARD,
ELIAS JACOBSEN.